United States Patent [19]

von Bonin et al.

[11] Patent Number: 4,659,797
[45] Date of Patent: Apr. 21, 1987

[54] MATRIX MATERIALS AND A PROCESS FOR THEIR PREPARATION

[75] Inventors: Wulf von Bonin, Leverkusen; Johannes Blahak, Krefeld; Ulrich von Gizycki, Leverkusen; Lothar Preis, Bergisch-Gladbach, all of Fed. Rep. of Germany

[73] Assignee: Bayer Aktiengesellschaft, Bayerwerk, Fed. Rep. of Germany

[21] Appl. No.: 847,373

[22] Filed: Apr. 2, 1986

[30] Foreign Application Priority Data

Apr. 18, 1985 [DE] Fed. Rep. of Germany ....... 3513980

[51] Int. Cl.$^4$ .............................................. C08G 18/32
[52] U.S. Cl. ....................................... 528/28; 528/72; 528/73; 528/74.5; 528/75; 528/80; 528/81; 528/85
[58] Field of Search .................... 528/49, 73, 74.5, 75, 528/72, 80, 81, 85, 28

[56] References Cited

FOREIGN PATENT DOCUMENTS 1518546 4/1967 France.
1159213 7/1969 United Kingdom.

*Primary Examiner*—Maurice J. Welsh
*Attorney, Agent, or Firm*—Gene Harsh; Joseph C. Gil; Lyndanne M. Whalen

[57] ABSTRACT

Polyurethane-based matrix materials are made by reacting a phenol which is at least bifunctional with an aromatic isocyanate which is at least difunctional in the presence of 1-40 wt. % soft segment former. The soft segment former is a compound containing long chain aliphatic groups having at least six carbon atoms in the aliphatic group, an isocyanate-reactive group and a molecular weight of from 800 to 10,000. From 90 to 130 equivalent percent of isocyanate groups (based on the total of isocyanate-reactive groups present in the phenol and soft segment former) are employed. These matrix materials are particularly useful in the production of composite materials and as adhesives.

19 Claims, No Drawings

MATRIX MATERIALS AND A PROCESS FOR THEIR PREPARATION

BACKGROUND OF THE INVENTION

This invention relates to filled and unfilled matrix materials of aromatic polyurethanes having at least a diphasic structure and a process for their production.

Polyurethanes have been used as industrial materials even though it is known that the urethane bond tends to break down at elevated temperatures. Aliphatic polyurethanes however are sufficiently stable for the synthesis of thermoplastically workable materials. Aromatic polyurethanes are less stable under these conditions because the aromatic urethane bond is more thermolabile. Due to this thermolability, such aromatic urethanes (e.g., reaction products of phenol and aromatic polyisocyanates) are used as thermal isocyanate releasing compounds. That is, the phenol as well as the polyisocyanate is released from the aromatic urethane at temperatures of around 140° C.

SUMMARY OF THE INVENTION

It has now been found however that it is possible to react polyfunctional (preferably bifunctional) phenols with polyfunctional, aromatic isocyanates in the presence of certain soft segment formers to yield polymer resins linked by urethane bonds characterized by excellent properties even at temperatures above 140° C. (e.g., Martens degrees above 170° C.).

It has further been found that these aromatic polyurethanes can be modified to improve their elongation at break to a value in the region of 6% (particularly desirable for composite materials) without seriously impairing their basic properties. This may be achieved by including certain so-called soft segment formers, which may have an aliphatic, araliphatic or aromatic character, in the reaction of the polyisocyanates with the polyphenols. It is surprising, however, that the only soft segment formers suitable for this purpose are those which result in the formation of an at least diphasic reaction product which is in most cases at least partly or completely opaque. Soft segment formers which have an aliphatic character are preferred.

The aromatically based polyurethanes containing soft segment formers of the present invention result in products which are at least diphasic and are technically advantageous because they possess the high heat deflection temperature, high tensile strength, satisfactory impact strength and the desired elongation at break in the region of 6% (Preferably 5 to 7%) demanded of superior matrix materials for use in composite fiber materials. Materials which not only have this combination of properties but can also be produced from inexpensive, readily available starting products are obtained in the present invention.

This invention thus relates to matrix materials, to a process for their preparation and to their use for the manufacture of composite materials (shaped parts) which may be either unfilled for filled with fibers and/or fillers of a different geometrical configuration. These matrix materials are the reaction products of phenols which are at least bifunctional and bifunctional aromatic isocyanates, together with soft segment formers containing isocyanate reactive groups and resulting in matrix materials or shaped parts which are multiphasic. Matrix materials which are prepared with the aid of soft segment formers having long chain ($\geq 6$ carbon atoms) aliphatic groups in the molecule and manifest a diphasic or multiphasic character in the material are particularly advantageous. The matrix materials of the present invention are particularly useful for the preparation of fiber reinforced composite materials which are reaction products of multinuclear bisphenols and soft segment formers based on dimeric fatty acid polyesters with a preferably at least stoichiometric quantity of aromatic polyisocyanates, preferably aromatic polynuclear polyisocyanates, more preferably those based on phosgenation products of aniline-formaldehyde condensates. These matrix materials may also be used for the manufacture of shaped parts and structural elements as composite materials. Such composite materials are preferably tempered at temperatures of 140° C. to 220° C. (preferably up to 200° C.) to enable them to achieve their optimum properties.

DETAILED DESCRIPTION OF THE INVENTION

The present invention relates to a process for the preparation of filled or unfilled matrix materials or shaped or molded bodies based on polyurethanes in which a phenol which is at least bifunctional (preferably a multinuclear bisphenol) is reacted with an aromatic isocyanate which is at least difunctional, and 1 to 40 wt. % of soft segment formers containing isocyanate reactive groups and resulting in multiphasic matrix materials, which soft segment formers have long chain aliphatic groups with $\geq 6$ carbon atoms and molecular weights of from 800 to 10,000. Fibers and fillers and other additives conventionally used in polyurethane chemistry may also be used.

In this process, the phenol isocyanate and soft segment forming components are mixed together in the molten state or in solution in quantities such that with the optional addition of fibers, fillers and conventional additives, the isocyanate groups amount to 90 to 130 equivalent percent of the isocyanate reactive groups from the phenol and soft segment former. The masses obtained are optionally supplied to a mold and reacted at elevated temperatures, preferably at 140° to 220° C. Shaped products are optionally tempered at 140° to 220° C.

The invention also relates to the polyurethane-based filled and unfilled matrix materials which are the reaction products of a phenol which is at least bifunctional, preferably a multinuclear bisphenol, an at least bifunctional aromatic isocyanate, preferably a commercial MDI mixture, and 1 to 40 wt. % (based on the amount of phenol and isocyanate) of a soft segment former giving rise to multiphasic matrix materials. These soft segment formers contain long chain aliphatic groups with $\geq 6$ carbon atoms in the aliphatic group and isocyanate reactive groups (preferably hydroxyl groups), and have molecular weights of from 800 to 10,000 (preferably 800 to 5000). The isocyanate groups from the aromatic isocyanate amount to 90 to 130 equivalent percent, based on the isocyanate reactive groups from the phenol and soft segment former. Fibers, fillers and other additives conventionally used in polyurethane chemistry may be optionally included.

The invention also relates to the use of the mixture of liquid phenol isocyanate and soft segment forming reactants, optionally together with fibers, fillers and conventional additives, or of the melt of the incompletely reacted matrix materials for the manufacture of composite materials. Such composite materials may be formed by impregnation of non-woven fiber webs, yarn packages, rovings and fiber strands, shaping the masses which are optionally in prepreg form, thermal hardening and optionally tempering at temperatures of from 140° to 220° C. The reactant mixtures may also be used for the thermoplastic shaping of incompletely reacted matrix materials, for pressing as thermoplastic materials, for powder lacquer coatings or for the formation of adhesives or foams in the form of unreacted or only partly reacted matrix materials. They may also be used for the formation of coatings from solutions of unreacted or imcompletely reacted matrix materials.

The fibers and fillers of different geometrical configuration used in this invention include organic and/or inorganic fibers such as glass fibers, carbon fibers, kaolin fibers, carbides in fiber form, quartz fibers, asbestos fibers, metal fibers, corundum fibers, aramide fibers and other organic and inorganic, high temperature resistant fibers. Fibers of any length and shape as well as filler particles or mixtures thereof in the form of powders, platelets, dumb-bell shaped particles or spheres or hollow beads or foam may also be used.

Fillers may be organic or inorganic substances such as aromatic polyimides, graphite, carbon black, flue dust, mica, glass or hollow glass beads, sand, mineral or rock powder, metal powder, ferrites, oxides and other known fillers.

The bifunctional phenols useful in the present invention are aromatic molecules containing at least two phenolic OH groups, such as hydroquinone or resorcinol, but preferably bifunctional multinuclear phenols corresponding to the general formula

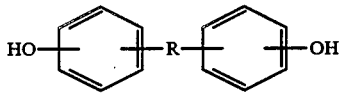

in which R represents a single bond or an element or group which is at least divalent, such as O, S, SO, SO$_2$ or NR' (R'=H and/or an aliphatic or aromatic group such as CH$_3$ or C$_6$H$_5$); Si(R")$_2$; CO; O(CO)O; NN; CHR'; R'—CR' such as CH$_2$, CHCH$_3$, CH$_3$CCH$_3$; C$_6$H$_4$; OC$_6$H$_4$O; O(C$_6$H$_4$R''')$_n$; O(POCH$_3$)O; O(-POC$_6$H$_5$)O or O(COC$_6$H$_4$R'''O)$_n$ (R"=an aliphatic, cycloaliphatic and/or aromatic group, preferably CH$_3$ or C$_6$H$_5$; R'''=alkylene, cycloalkylene or arylene, n=1, 2 or 3; preferably 1).

Other preferably bifunctional bisphenols may also be used. For example, bisphenols of the phenolphthalein series, particularly those having a hereocyclic basis such as 3,6-dihydroxy-9,9-dimethylxanthene, N,N'-hydroxyphenyl-pyromellitic acid-bis-imide or bis-hydroxytetramethyl-spiroindan.

Mixed forms of the various bisphenols may be used and mixtures of different polyphenols may also be used in the practice of the present invention. Phenols which are higher than bifunctional may also be used, at least in minor quantities, preferably in quantities no greater than 15 wt. %.

It is preferred to use bisphenols having melting points below 200° C. Bisphenols from the series of readily obtainable 4,4'-dihydroxy-diphenylpropane, 4,4'-dihydroxy-diphenylether and dihydroxy-diphenylsulphone and mixtures thereof are particularly preferred.

The aromatic isocyanates useful in the practice of the present invention are at least difunctional and include 4,4'-diisocyanatodiphenylmethane (MDI), particularly commercial types of MDI (i.e. polyisocyanates obtained, for example, by the phosgenation of anilineformaldehyde condensates) which contain isomers of 4,4'-diisocyanatodiphenylmethane as well as multinuclear products and other aromatic di- and/or polyfunctional isocyanates such as 4,4'-, 2,4'- and/or 2,2'-diisocyanatodiphenyl-ethers, -ketones, -carbonates, -sulphonates and -ethanes, bis-(4-isocyanatophenoxy)alkanes (alkane group having 2 to 6 carbon atoms) and naphthylene diisocyanates such as 1,5-naphthylene diisocyanate. Commercial tolylene diisocyanates or tolylene diisocyanate mixtures may also be used but they are less preferred. Mixtures of such isocyanate components may also be used.

It is particularly preferred to use 4,4'-dihydroxy-diphenylpropane as the phenol in the process of the present invention and commercial mixtures of MDI as the isocyanate.

The soft segment formers used in the present invention are isocyanate reactive (e.g., contain OH or primary or secondary amino or carboxyl groups, preferably hydroxyl groups) and preferentially lead to the formation of a multiphase resin matrix. Soft segment formers of this kind are in most cases initially soluble in the reaction mixture and lead to a multiphase system in the course of the reaction as evidenced by the fact that the polymer matrix is no longer clearly transparent but has a milky cloudiness or is completely opaque.

Suitable soft segment formers containing long chain aliphatic groups and resulting in a multiphase product are those which have aliphatic alkylene groups with at least 6 (preferably at least 9) carbon atoms in the chain and isocyanate reactive end groups. Examples of such soft segment formers include olefin oligomers containing OH groups or copolymers of unsaturated hydrocarbons having at least 9 carbon atoms (e.g. copolymers of octadecene), (partially saponified) copolymers of fatty acid vinyl esters based on carboxylic acids having at least 9 carbon atoms (e.g. of vinyl laurate or vinyl stearate), saponified or partially saponified copolymers of ethylene or other olefins with acrylic or vinyl esters (such as vinyl acetate), (partially saponified) transesterification products of olefin/vinyl ester copolymers with fatty acids having ≧9 carbon atoms, OH-containing oligomers of epoxidized oils (e.g. of epoxidized soya bean oil), and OH-containing polymers and oligomers of acrylates and/or methacrylates with fatty alcohols having at least 9 carbon atoms. Due to their ready accessibility, polyesters based on dimerized and/or trimerized fatty acids and long chain (having at least 6 carbon atoms, preferably up to 18 carbon atoms) diols or polyols (e.g. hexane-1,6-diol) polyesters of dimerized oleic acid with molecular weights of about 1200 to 2500 (particularly about 1300 to 1500) are preferred.

Mixtures of such soft segment former components may also be used.

The molecular weights of the soft segment formers should be from 800 to 10,000, preferably from 1000 to 5000, and their OH numbers from 5 to 500, preferably from 25 to 160. Soft segment formers containing OH groups are particularly preferred.

The matrix resins and composite materials of the present invention are preferably prepared under anhydrous conditions from dried starting materials.

In the mixture of the phenol which is at least bifunctional and the soft segment former, the soft segment former should be present in quantities of from 1 to 40 wt. %, preferably from 3 to 30 wt. %, most preferably from 5 to 20 wt. %.

Based on the quantity of isocyanate reactive groups (Zerewitinoff active groups; e.g., OH groups) present in the mixture of the at least bifunctional phenol and the soft segment former, the quantity of polyisocyanate put into the process should be from 90 to 130%, preferably at least the stoichiometric quantity (=100 equiv. %), in particular 105 to 120% of the stoichiometrically required quantity.

The usual additives used in polyurethane chemistry such as catalysts, stabilizers, light-protective agents, lubricants, silicones, pigments, dyes and similar additives may be used in the practice of the present invention.

The new matrix materials or shaped parts obtained from them are basically produced by melting or heating (optionally also dissolving) the components to a temperature at which all the components are liquid, mixing the liquid components and pouring them into a mold in which the reaction takes place with solidification at temperatures from 140° to 220° C. (preferably at 160° to 200° C.) for up to 50 hours. The mold is preferably pretreated with a mold release agent since the reaction products of the present invention adhere very firmly to most substrates. (The products may therefore also be used as adhesives.) If solutions have been used, the solvent is removed.

Variations of the process described above include distribution of the desired fillers in one or more of the components before, during or after the components have been melted. The reaction mixture containing the fillers may then be shaped and reacted. Alternatively, the mixture of molten components (i.e., the reaction mixture), may be used for impregnating non-woven fiber webs, yarn packages or rovings, and these may subsequently be shaped or hardened. The prepreg technique may also be employed.

In another embodiment of the present invention, the reaction mixture containing fillers or free from fillers is cooled to room temperature before gelling (in most cases after a few minutes' reaction time) so that a material which can be crushed to powder (optionally, a thermoplastic) is obtained. This material, optionally after the addition of further filler, may be applied to suitable substrates or shaped (e.g., by hot pressing) and then melted in the same manner as an ordinary commercial Duroplast, and/or it may be softened so that it can be shaped and optionally hardened by tempering. Coating methods used for powder lacquers are also applicable.

Although the reaction may be catalyzed with acids or bases such as the amines or organometallic catalysts commonly used in polyurethane chemistry, it is advantageous to dispense with their use.

The maxtix resins of the present invention (matrix materials) may be used as impregnation resins for the manufacture of fiber reinforced composite materials or shaped products and structural elements. They are suitable for use as coatings applied to metallic or non-metallic substrates. Such coatings may be applied from solutions of the reaction mixtures or by spraying or by the technique used for powder lacquers. The matrix materials may also be used as adhesives, foams, barrier layers or membrane formers for gas and liquid separating processes. They may also be used for the manufacture of composite bodies or structural elements in aircraft and vehicle construction which are subjected to high stresses and heavy wear and for the manufacture of exceptionally stable base materials for electronic equipment.

The invention will be illustrated below by way of example. The parts and percentages given are parts and percentages by weight, unless otherwise indicated.

EXAMPLES

The following experiments were carried out using a commercial multinuclear polyisocyanate (MDI) which had been prepared from aniline-formaldehyde condensates and had an isocyanate content of from 30 to 32% and a maximum hydrolyzable chlorine content of 0.3%.

The bisphenol used was commercial 4,4'-dihydroxydiphenylpropane.

The soft segment former giving rise to a multi-phase structure was a polyester of hexane-1,6-diol and commercial dimerized oleic acid, OH number 85, acid number of about 1 and osmotically determined molecular weight of about 1400.

For comparison, an adipic acid/ethylene glycol polyester (OH number 90, acid number about 9) was used as a soft segment former which remained homogeneous.

The examples summarized in the following Table illustrate the positive effect of using larger than stoichiometric quantities of isocyanate, the difference between soft segment formers which remain homogeneous and those which give rise to a diphasic system, and the surprising and positive effect the latter type of soft segment former.

The mixture of bisphenol and optionally soft segment former was dehydrated under vacuum at 120° C. and then melted at 160° C. The required quantity of isocyanate preheated to 120° C. was then stirred in and the liquid reaction mixture poured within 3 minutes into a plate mold which had been pretreated with a mold release agent based on wax and silicone. The mold was preheated to 150° C. and was tempered for 3 hours at 180° C. after it had been filled so that the reaction mixture hardened. The product obtained on removal from the mold was a clear, transparent light brown molded body except for those examples in which the soft segment former leading to a diphasic system was used. The diphasic material required in the present invention formed opaque plates which were homogeneously colored light brown.

Standard test rods were cut from the plates for carrying out the mechanical tests and measured.

| EXAMPLE NO. | 1* | 2* | 3* | 4 | 5 | 6* | 7* | 8 |
|---|---|---|---|---|---|---|---|---|
| (A) Composition | | | | | | | | |
| Bisphenol (parts by wt.) | 274 | 274 | 274 | 233 | 233 | 274 | 233 | 233 |
| Soft segment, homogeneous (parts by wt.) | — | — | — | — | — | — | 41 | — |
| Soft segment, | — | — | — | 41 | 41 | — | — | 41 |

| EXAMPLE NO. | 1* | 2* | 3* | 4 | 5 | 6* | 7* | 8 |
|---|---|---|---|---|---|---|---|---|
| diphasic (parts by wt.) | | | | | | | | |
| Isocyanate (parts by wt.) | 300 | 360 | 450 | 287 | 313 | 345 | 310 | 301 |
| Stoichiometry in % | 100 | 120 | 150 | 110 | 120 | 115 | 115 | 115 |
| (B) Properties | | | | | | | | |
| Martens degree$^a$ in °C. | 161 | 175 | 176 | 170 | 171 | 170 | 152 | 173 |
| Tear resistance$^b$ N/mm$^2$ | 62.0 | 83.9 | — | 81.4 | 81.9 | 92.83 | 91.0 | 88.5 |
| E-modulus N/mm$^{2c}$ | 3290 | 3130 | 3170 | 2796 | 2810 | 3297 | 3896 | 3250 |
| Elongation on$^d$ tearing in % | 2.32 | 3.73 | 1.72 | 6.10 | 6.55 | 4.35 | 4.05 | 6.63 |
| Ball indentation$^e$ hardness N/mm$^2$ | — | — | — | 146 | 145 | 201 | 187.2 | 176 |

*Comparison Examples
$^a$DIN 53458
$^b$DIN 53455
$^c$DIN 53457
$^d$DIN 53455
$^e$DIN 53457

Examples 1 to 3 illustrate that when no soft segment former is used in the matrix materials, the molded articles obtained have adequate mechanical properties but low elongation on tearing.

Example 7 shows that monophasic matrix materials result in low Martens degrees and low values for elongation on tearing.

Examples 4, 5 and 8 show that excellent combinations of properties in the molded products can be obtained by means of the soft segment formers which according to the invention lead to a diphasic structure. Particularly valuable properties of materials obtained according to the present invention are the combination of high Martens degrees with an elongation on tearing of around 6%.

EXAMPLE 9

The freshly prepared reaction mixture from Example 8 was stirred at 150° C. for 3 minutes, the increase in viscosity indicated the onset of the reaction. The material was then transferred to a cooling roller where it solidified and was stripped off in scales.

A portion of the scales was mixed with quartz sand and then pressed on a heating press at 180° C. after 18 weeks' storage at 25° C. to form a plate which was 75% quartz filler. This plate was able to withstand prolonged exposure to temperatures of 160° C. without suffering a loss of more than 5% of its mechanical properties after 3 months.

Another portion of the scales was ground down and mixed with hollow silicate beads (diameter below 0.3 mm) in a ratio of scales to silicate beads of 1:4. This mixture was pressed on a heating press at 180° C. (pressing time 15 minutes) to form a plate having a specific gravity of 0.45 g/cm$^3$. This plate manifested the same aging properties as the plate which was filled with quartz powder.

Another portion of the scales was ground down to a powder having a particle size below 0.1 mm which was shaken into a glass fiber web. The web was pressed for 1 minute at 125° C. to form a rigid prepreg, i.e. a rigid mat which was fused with the resin and had a resin content of about 50%. This mat or web could be used to press hemispherical protective helmets at 185° C.

EXAMPLE 10

A molten reaction mixture corresponding to that used in Example 8 was passed over a roving, and the roving was impregnated in a zone heated with infrared radiant heaters before it was wound to form a hollow body. The hollow body itself was maintained at about 150° C. by radiant heaters during winding. The finished hollow body had a resin content of about 35% and was cured at 180° C. for 4 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of matrix materials based on polyurethane in which
   (a) a phenol which is at least bifunctional is reacted with
   (b) an aromatic isocyanate which is at least difunctional in the presence of
   (c) 1–40 wt. % soft segment former containing long chain aliphatic groups with at least six carbon atoms in the aliphatic group and an isocyanate reactive group and having a molecular weight of from 800 to 10,000 in quantities such that from 90 to 130 equivalent percent of isocyanate groups based on the total of isocyanate reactive groups in (a) and (c) are initially present.

2. The process of claim 1 in which the components (a), (b) and (c) are introduced into a mold and reacted at elevated temperature.

3. The process of claim 2 in which the molded reaction product is tempered at 140° to 220° C.

4. The process of claim 1 in which fibers and/or fillers are incorporated into the reaction product.

5. The process of claim 1 in which the phenol (a) is a multinuclear bisphenol.

6. The process of claim 1 in which the phenol (a) corresponds to the formula

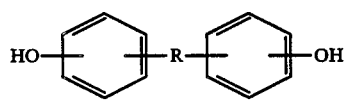

in which

R represents O, S, SO, SO$_2$, NR', Si(R")$_2$, CO, O(CO)O, NN, CHR', R'CR', C$_6$H$_4$, OC$_6$H$_4$O, O(C$_6$H$_4$R'''O)$_n$, O(POCH$_3$)O, O(POC$_6$H$_5$)O- or O(COC$_6$H$_4$R'''O)$_n$, R' represents hydrogen, an aliphatic group or an aromatic group, R" represents an aliphatic, cycloaliphatic or aromatic group, R''' represents an alkylene, cycloalkylene or arylene group, and n represents 1, 2 or 3.

7. The process of claim 1 in which the phenol (a) is a bifunctional bisphenol of the phenolphthalein type.

8. The process of claim 1 in which the phenol (a) is selected from the group consisting of 3,6-dihydroxy-9,9-dimethylxanthene, N,N'-bis-hydroxyphenylpyromellitic acid-bis-imide, bis-hydroxytetramethylspiroindan and mixtures thereof.

9. The process of claim 1 in which the phenol (a) is a bisphenol having a melting point below 200° C. selected from 4,4'-dihydroxy-diphenylpropane, 4,4'-dihydroxy-diphenylether, 4,4'-dihydroxy-diphenylsulfone and mixtures thereof.

10. The process of claim 1 in which the isocyanate (b) is selected from 4,4'-diisocyanatodiphenylmethane; mixtures of MDI obtained by phosgenating an aniline/formaldehyde condensate and containing 4,4'-, 2,2'- and/or 2,4'-isomers of diisocyanatodiphenylmethane and multinuclear derivatives; 4,4'-, 2,4'- and/or 2,2'-diisocyanato-diphenylethers; 4,4'-, 2,4'- and/or 2,2'-diisocyanato-diphenylketones; 4,4'-, 2,4'- and/or 2,2'-diisocyanato-diphenylcarbonates; 4,4'-, 2,4'- and/or 2,2'-diisocyanato-diphenylsulfones; 4,4'-, 2,4'- and/or 2,2'-diisocyanato-diphenylethanes; bis-(4-isocyanato-phenoxy)-alkanes; naphthalenediisocyanates and mixtures thereof.

11. The process of claim 1 in which the phenol (a) is 4,4'-dihydroxy-diphenylpropane and the isocyanate (b) is an MDI mixture containing 4,4'-, 2,4'- and/or 2,2'-isomers of diisocyanatodiphenylmethane and multinuclear derivatives thereof.

12. The process of claim 1 in which the soft segment former (c) is a compound having long chain aliphatic groups with at least 9 carbon atoms in the aliphatic chain containing isocyanate reactive end groups and having a molecular weight of from 1000 to 5000.

13. The process of claim 12 in which the soft segment former is selected from OH-containing olefin oligomers and copolymers of unsaturated hydrocarbons having at least 9 carbon atoms, (partly saponified) copolymers of fatty acid vinyl esters based on carboxylic acids having at least 9 carbon atoms, saponified and partly saponified copolymers of ethylene and other olefins with acrylic or vinyl esters, (partly saponified) trans-esterification products of olefin/vinyl ester copolymers with fatty acids having at least 9 carbon atoms, OH-containing oligomers of epoxidized oils, OH-containing oligomers and (CO) polymers of acrylates and/or methacrylates with fatty alcohols having at least 9 carbon atoms and OH-containing polyesters based on dimerized and/or trimerized fatty acids and long chain diols and polyols having at least 6 carbon atoms.

14. The process of claim 13 in which the soft segment former is used in a quantity of from 3 to 30 wt. %.

15. The process of claim 1 in which the soft segment former (c) is an OH-containing polyester based on dimerized oleic acid and 1,6-hexanediol having a molecular weight of from 1200 to 2500.

16. A matrix material based on polyurethane which is the reaction product of (a) a phenol which is at least bifunctional, (b) an aromatic isocyanate which is at least difunctional in an amount which is 90–130 equivalent percent NCO groups (based on total isocyanate-reactive groups), and (c) 1–40 wt. % (based on total phenol and soft segment former) soft segment former which produces multiphase matrix materials and which contains at least 6 carbon atoms in the aliphatic group, an isocyanate reactive group and a molecular weight of from 800 to 10,000.

17. The matrix material of claim 16 in which fibers and/or fillers have been incorporated.

18. The matrix material of claim 17 in which the phenol (a) is 4,4'-dihydroxy-diphenylpropane, the isocyanate (b) is an MDI mixture containing 4,4'-, 2,4'- and/or 2,2'-isomers of diisocyanatodiphenylmethane and multinuclear derivatives thereof and the soft segment former (c) is a compound having long chain aliphatic groups with at least 9 carbon atoms in the aliphatic chain, containing isocyanate-reactive end groups and having a molecular weight of from 1000 to 5000.

19. A process for the production of composite materials in which (a) a liquid mixture of the components used to form the matrix material of claim 16 is used to impregnate non-woven fiber webs, yarn packages, rovings or fiber strands, (b) the impregnated material is shaped, and optionally, (c) the shaped material is tempered at 140° to 220° C.

* * * * *